March 3, 1964     E. R. KEBBON     3,122,845
AIRCRAFT TRAINING APPARATUS FOR VISUAL LANDING APPROACH
Filed Oct. 19, 1961     3 Sheets-Sheet 1
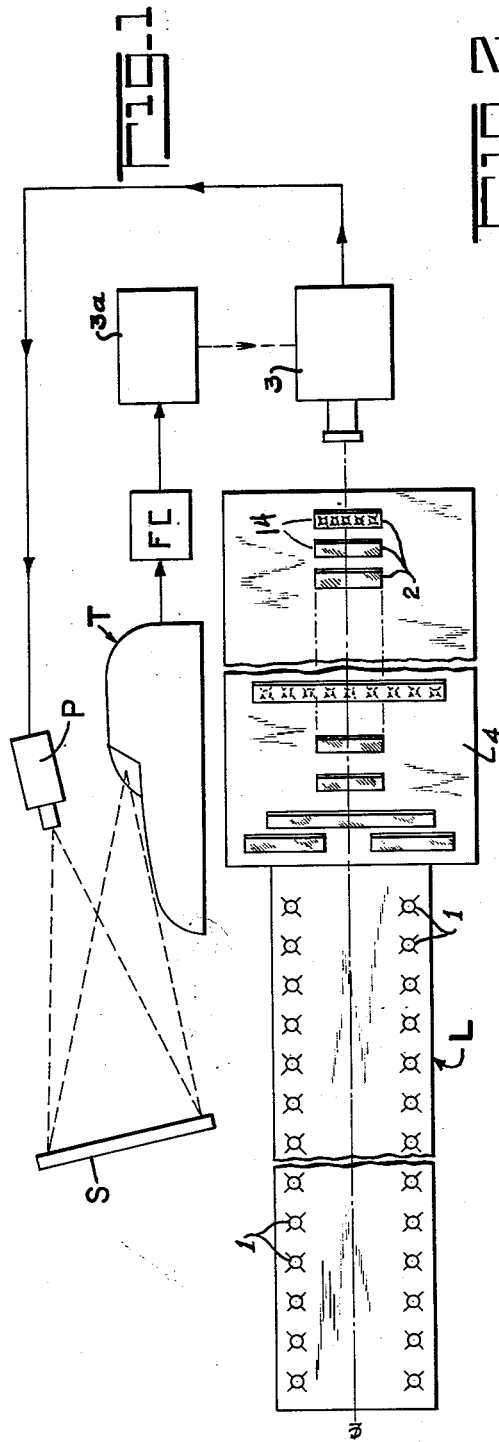
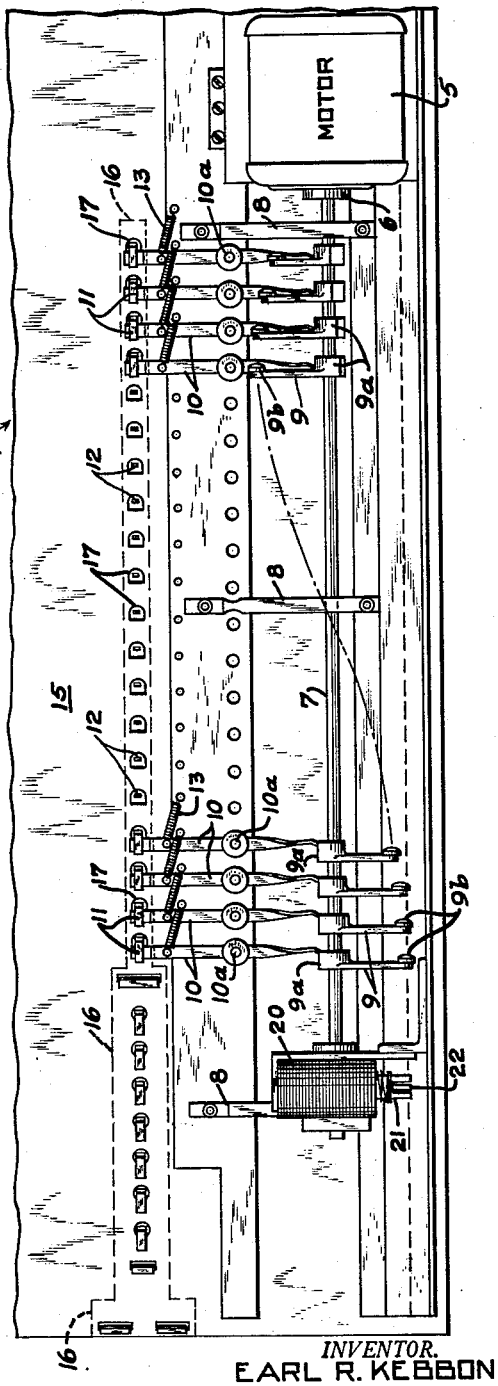
INVENTOR.
EARL R. KEBBON
BY
*Orin R. Severn*
HIS ATTORNEY March 3, 1964 E. R. KEBBON 3,122,845
AIRCRAFT TRAINING APPARATUS FOR VISUAL LANDING APPROACH
Filed Oct. 19, 1961 3 Sheets-Sheet 2
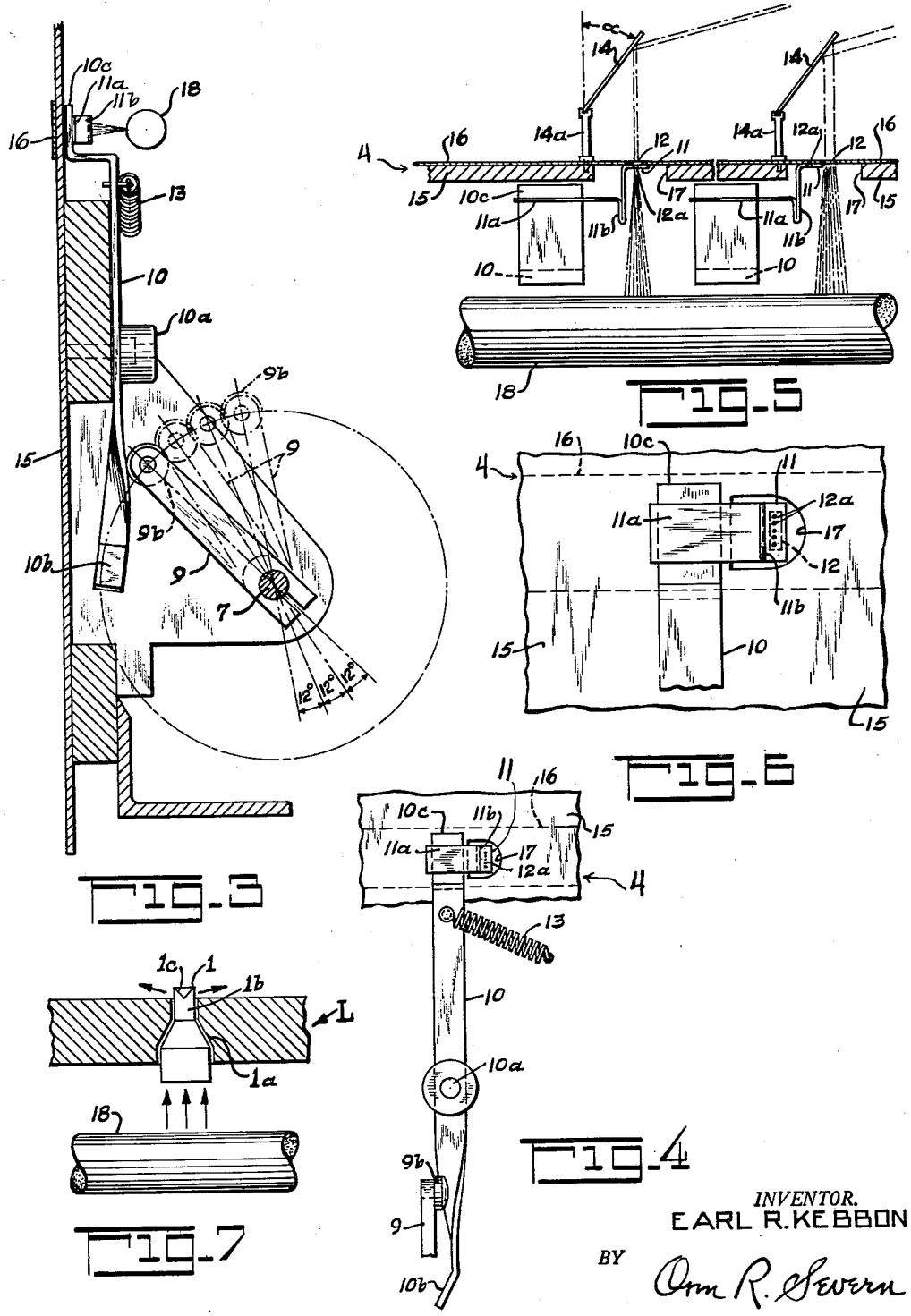
INVENTOR.
EARL R. KEBBON
BY
Orm R. Severn
HIS ATTORNEY March 3, 1964   E. R. KEBBON   3,122,845
AIRCRAFT TRAINING APPARATUS FOR VISUAL LANDING APPROACH
Filed Oct. 19, 1961   3 Sheets-Sheet 3

*INVENTOR.*
EARL R. KEBBON
BY
HIS ATTORNEY

United States Patent Office 3,122,845
Patented Mar. 3, 1964

3,122,845
AIRCRAFT TRAINING APPARATUS FOR VISUAL LANDING APPROACH
Earl R. Kebbon, Upper Montclair, N.J., assignor to Curtiss-Wright Corporation, a corporation of Delaware
Filed Oct. 19, 1961, Ser. No. 146,148
14 Claims. (Cl. 35—12)

The present invention relates to means for simulating the visual approach of aircraft to landing field runways or landing strips, and in particular to simulation of night landing approach to a field having an array of approach and landing lights.

Heretofore, it has been proposed that night landing approach be simulated by means of optical pick-up and projection equipment arranged so as to view simulated runway lights on a landing strip. The optical pickup device and the simulated air strip were arranged for relative movement, and the runway strip was provided with fluorescent paint portions activated to represent the runway lights.

Arrangements of the character described above have inherent disadvantages for simulating modern landing fields. In the first place, the low intensity fluorescent effect is further diminished in transmission through the optical equipment so that the projected view is not sufficiently bright and distinct; furthermore such an arrangement does not lend itself to small scale or miniaturized simulation, as for example on a scale of 1600:1; nor does it lend itself to simulation of approach lighting systems having one or more direction rows of sequentially flashing lights, referred to herein as "strobe" lighting. In practice, the strobe lights are arranged along the longitudinal axis of the approach in advance of the conventional runway lights and sequentially flash so as to create the impression of a ball of light moving toward the landing strip. Thus the pilot has a clear and conspicuous indication of the flight direction for landing the aircraft.

In accordance with the present invention the conventional runway landing lights and the strobe direction lights are simulated by improved means so as to transmit comparatively high intensity lighting to the optical pick-up apparatus, and also to simulate in realistic manner the sequential flashing of the direction strobe lights. With this arrangement the projected representation of the landing field is comparatively clear and distinct and realistically simulates an aircraft approach to a modern landing field.

A principal object therefore of the present invention is to provide an improved and realistic simulation of night landing approach of aircraft to a lighted landing field.

The invention will be more fully set forth in the following description referring to the accompanying drawings, and the features of novelty will be pointed out with particularity in the claims annexed to and forming a part of this specification.

Referring to the drawings, FIG. 1 is a schematic illustration showing the application of the present invention to conventional flight simulating equipment;

FIG. 2 is a plan view, showing the underside of the simulated landing and approach facility;

FIG. 3 is a detailed end view of the camming mechanism and strobe light control apparatus of FIG. 2;

FIG. 4 is a detailed view showing the cam and strobe light lever arrangement of FIG. 3, as viewed transversely of the main cam shaft;

FIG. 5 is a detailed view in elevation of the simulated landing field, showing the arrangement of the reflecting mirror, strobe light shutter and light source for representing both normal and strobe lighting;

FIG. 6 is a detailed view showing the underside of the shutter, including detail of FIG. 5;

FIG. 7 is a detailed view of a simulated landing field light;

Figure 8:
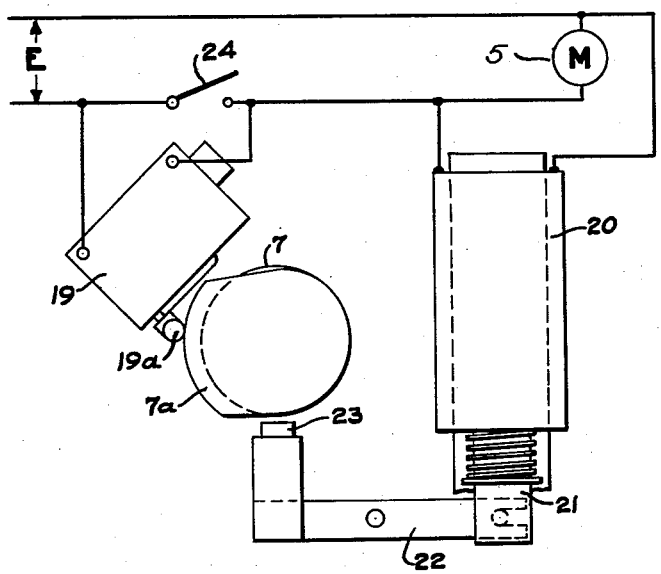
FIG. 8 is a further detailed view illustrating an arrangement for adapting the approach lighting system to a non-flashing pattern where desired.

Referring to FIG. 1, the simulated landing field that is generally represented by L, comprises a flat elongated strip of material that is suitably apertured and perforated to indicate the respective positions of the runway lights 1 and approach and strobe lights 2. Suitable optical pick-up and projection means may comprise a television camera 3 and a projector P arranged to display the lighted landing strip on a projection screen S. This screen is suitably positioned so as to be clearly viewed by the pilot who is operating the controls of a conventional flight trainer, generally indicated at T. The simulated aircraft controls operable by the pilot within the trainer T command in known manner a flight computer FC. The computer in turn functions to control suitable motive means 3a for positioning the camera 3 with respect to the landing field L according to simulated flight speed and attitude. It will be understood of course that the present arrangement wherein the landing field is fixed is shown by way of example, and the relative movement between the camera and landing strip may include longitudinal and/or transverse movement of the landing field if such is preferable.

In practice, the camera 3 is carried by a dolly, or the like (not shown) that is movable along the longitudinal axis of the landing field and above the landing field, so as to approach the landing field in a manner analogous to aircraft approach. The attitude of the camera with respect to roll, pitch, altitude and yaw is suitably controlled by respective motors (motive means 3a) that are in turn controlled according to the roll, etc., signals from the conventional flight computer FC. These attitude movements of the camera are performed by means of suitable mounts, such as a transverse carriage, gimbals, etc. carried by the dolly. Thus, the projected representation of the lighted airfield on the screen S shows the field as the pilot would see it for a corresponding attitude of the aircraft.

Referring in detail to the simulated landing field lighting arrangement, FIGS. 2 to 6 illustrate the strobe light control. FIGURE 2 shows the flashing control structure mounted on the underside of the strobe light support panel 4 and arranged to sequentially control light transmission from the underside of the panel through a row of spaced apertures in the panel representing the strobe light positions, as presently described.

The apparatus essentially comprises a motor 5 having built-in reduction gearing for rotating through a pinion and gear drive at 6, a main cam shaft 7. The cam shaft is mounted at three points in bearings 8 that depend from the panel 4, and carry a plurality of camming arms 9 that are spaced longitudinally along the cam shaft 7 at distances corresponding to the respective strobe light positions. The arms are angularly spaced on the shaft about twelve degrees apart, thereby to provide the desired sequential camming operation. Each arm 9 is fixed to the shaft by a collar 9a and is provided at its camming end with an off-set cam roller 9b, FIG. 3.

The associated cammed members comprise respectively a corresponding number of levers 10, each of which is pivotally mounted at its mid-portion 10a with respect to the panel 4 so as to rotate in a plane parallel to the panel. The cammed end (lower end as viewed in FIG. 2) is conveniently formed as a strip that is twisted through an angle of 90°. A portion at its extremity is bent through an angle of approximately 20° to form a co-acting cam portion 10b, FIG. 4. The opposite, or light controlling end of the lever 10 has an off-set portion 11 hereinafter described in more detail, forming a perforated shutter arranged to close a corresponding aperture 12, FIG. 5, formed in the panel structure. Five small perforations in the shutter transmit light to represent approach lights, and momentary uncovering of the aperture 12 produces the more intense flashing light. Each strobe light arm 10 is biased by a spring 13 in opposition to camming action thus tending to close the flashing light aperture 12 and provide the normal multiple-light approach pattern.

The camming action will be apparent from inspection of FIGS. 2, 3 and 4. When a cam arm has rotated to a position about 15° counter-clockwise from that shown in FIG. 3, continued rotation of the cam roller 9b engages the off-set extension 10b so as to rotate the lever 10 counterclockwise as viewed in FIG. 2, thereby moving the shutter 11 toward the left so as to uncover the aperture 12, FIG. 5. Since the arms 9 are set progressively at equal angular positions on the camming shaft 7, it will be apparent that constant speed rotation of the motor 5 is effective to operate the shutters 11 so as progressively to open the strobe light apertures in a direction pointing toward the air field terminal. After the cam roller 9b has passed the tip of lever extension 10b, the spring 13 snaps the shutter back to the closed position. Thus, light transmitted through the momentarily opened apertures 12 closely simulates the sequential flashing of actual stroke lights. In practice, the motor 5 through its gear reducer operates the cam shaft at a speed corresponding to strobe lighting at two cycles per second for example.

FIGURES 5 and 6 show in more detail the light transmitting and reflecting arrangement. In FIG. 5 the strobe light panel 4 is shown as formed for convenience in fabrication, by a base plate 15 and a thin surface plate 16. The base plate 15 is provided with an enlarged aperture 17 of sufficient width to permit operation of the comparatively thin shutter 11 across the aperture 12 in the surface plate. The aperture 12 is rectangular in form so as to frame the row of five small openings formed in the shutter 11. Thus when the rectangular aperture 12 is uncovered by the shutter 11, high intensity light from a suitable source such as a fluorescent light tube 18, FIG. 5, is transmitted directly through the aperture 12 to a reflecting mirror 14 as indicated, and is reflected toward the camera pick-up lens. The light tube 18 is suitably mounted beneath the simulated landing facility L so as to extend along the entire longitudinal axis thereof.

The mirror 14 is suitably mounted at its lower edge on a vertical support 14a fixed to the thin surface plate 16. It is inclined at an angle α with respect to the vertical so that a bright intensity light beam is directed toward toward the camera. If desired, the angle α may vary to a small extent progressively from the first to the last strobe light mirror so as to match the aiming angle of the lights that are simulated. The mean value of α is about 52½°, and this angle can be used throughout if desired for ordinary simulating purposes.

The light transmitting arrangement is preferably such that when the simulated flight (camera) is nearly above a strobe light opening, the light source is baffled to an extent necessary to confine the direct light to that reflected by the mirror. To this end, the offset shutter structure has a vertically depending baffle 11b, conveniently formed by a compressed loop of the thin strip forming the shutter extension. The loop extends downward a sufficient distance to block off light that otherwise would be angled from the fluorescent light tube directly through the aperture 12 toward the pick-up camera. The arrangement of the mirror wherein its upper edge over-laps the aperture 12 also blocks off a vertical beam of direct light to the camera.

The simulated runway lights 1 on the main landing strip are arranged to diffuse the light transmitted from the source 18 radially at a low angle so as readily to be picked up by the camera. For this purpose, the landing light is formed of a transparent plastic known to the trade as "Lucite" and comprises an insert, FIG. 7, having a broad face frusto-conical portion and base 1a and an upper cylindrical portion 1b extending through the landing field panel L and protruding a small distance above it. The upper end of cylinder 1b is provided with a conical recess 1c, the cone angle being such that light transmitted through the cylinder 1b is refracted by the conical surface radially and laterally at a low angle so as readily to be picked up by the camera, as in the case of FIG. 5. The configuration of the "Lucite" insert is such that a comparatively high intensity beam is reflected at the cone 1c, as will be apparent from inspection of FIG. 7, referring to the light-gathering base 1a.

In certain installations, depending on the air facility to be simulated, it may be desirable to shut off the strobe lights while operating normally the other approach and landing field lights. For this purpose there is shown in FIGS. 2 and 8 means for automatically positioning all shutters in approach light position. This is accomplished by first shutting off the strobe light motor 5 by means of the main control switch 24, after which the cam shaft is automatically stopped at a predetermined position wherein all strobe light openings are closed by the perforated shutters 11. In this position, the five approach lights at each shutter position appear in the display.

Automatic positioning may conveniently be done for example by means of a microswitch 19 that is operated directly by the cam shaft 7, FIG. 8. The microswitch in turn controls a brake solenoid 20, FIGS. 2 and 8, for stopping the cam shaft. The solenoid is normally energized for the non-braking position. A cam portion 7a on shaft 7 representing the strobe light period, is arranged to engage the microswitch actuator 19a and close the microswitch when the cam shaft is within the angular limits of strobe lighting, representing the sequentially open positions of the shutters. When the microswitch is thus closed, the main switch 24 is shunted and the motor continues to operate until the end of the strobe period. At this point, the microswitch actuator 19a rides off the cam 7a and the microswitch opens. Switches 24 and 19 are now both open so that the motor is denergized, no voltage appears on the solenoid 20 and the brake is spring-biased to set. Specifically, the solenoid plunger 21 is depressed to rotate the brake lever 22 clockwise, thereby both braking and locking the cam shaft by means of the brake member 23. In this position, all strobe shutters are closed and the approach lights shine steadily through the shutter perforations to represent conventional approach lights.

Figure 9:
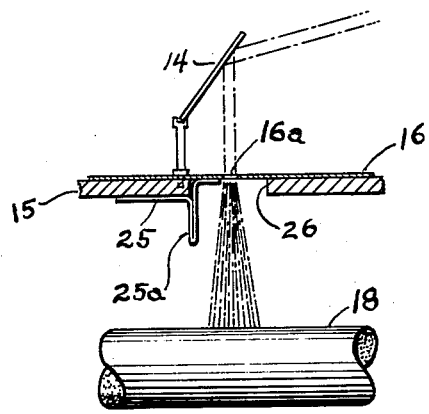
FIG. 9 is an elevational view in section of a portion of the simulated field, showing a light-baffle arrangement for the non-strobe approach lights.

A simple fixed light-baffle arrangement that may be used for the multiple non-strobe approach lights is shown by FIGS. 1 and 9. A thin strip 25 of suitable material is cemented at one end to the underside of the plate 15 at the light aperture 26, and is bent back on itself at 25a to form at right angles to the plate a light baffle. The thin surface plate 16 above the aperture is provided with small openings 16a to represent the positions of the non-strobe approach lights.

The baffle 25a thus functions in the same manner as the shutter baffle, FIG. 5, to preclude transmission direct non-reflected light from the light source to the pick-up camera.

An important feature of the present invention is the capacity for representing in limited space and in proper scale factor ratio a large amount of landing field detail not heretofore possible. For example, the approach lights, five or more in a row, are individually shown in the display. These lights are transmitted by the shutter perforations that are actually no more than .01 inch in diameter.

The more intense strobe lights are arranged to flash within a very short period such as 1/60 second so as to avoid excessive glare. The rectangular light pattern of the strobe flash tends to "bloom" when picked up by the camera so that the display actually shows a typical ball of light moving rapidly down the approach facility for each strobe cycle.

This as far as is known, has not been done previously by other techniques, except possibly by very large size equipment. Such equipment using proper scale factor ratios would be impractical due to the space required.

It should be understood that this invention is not limited to specific details of construction and arrangement thereof herein illustrated, and that changes and modifications may occur to one skilled in the art without departing from the spirit of the invention.

What is claimed is:

1. Simulating apparatus for training aircraft personnel in night landing approach comprising:
    (a) a simulated landing field having an array of approach and landing lights,
    (b) optical pick-up and projection means for presenting a display of said field, the optical pick-up means and landing field being relatively movable in simulation of aircraft landing approach,
    (c) means for simulating the aforesaid landing and approach lights including a light source arranged beneath the simulated field,
    (d) said landing field having apertures corresponding to the landing and approach light positions,
    (e) and means for directing light transmitted through said apertures respectively along an acute angle corresponding to the simulated flight approach direction toward said optical pick-up means to simulate landing and approach lighting effect.

2. Simulating apparatus for training aircraft personnel in night landing approach comprising:
    (a) a simulated landing field having an array of approach and landing lights,
    (b) optical pick-up and projection means for presenting a display of said field, the optical pick-up means and landing field being relatively movable in simulation of aircraft landing approach,
    (c) means for simulating the aforesaid landing and approach lights including a light source arranged beneath the simulated field along the longitudinal axis thereof,
    (d) said landing field having apertures corresponding to the light positions,
    (e) and means forming a light-receiving surface positioned at each of said apertures for directing a light beam from said light source toward said optical pick-up means to simulate landing field night lighting effect.

3. Simulating apparatus as specified in claim 2 wherein the light-receiving surface at some of said apertures is a mirror mounted at and above a respective aperture in acute angle relation to the landing field.

4. Simulating apparatus as specified in claim 2 wherein the light-receiving surface at some of said apertures is formed by a transparent material that is positioned partly within a respective aperture.

5. Simulating apparatus as specified in claim 4 wherein the transparent material is formed as a light-gathering insert, terminating in a reduced portion that extends above the field surface, said portion having a conical recess forming the light receiving surface.

6. Simulating apparatus for training aircraft personnel in night landing approach comprising:
    (a) a simulated landing field having an array of approach and landing lights,
    (b) optical pick-up and projection means for presenting a display of said field, the optical pick-up means and landing field being relatively movable in simulation of aircraft landing approach,
    (c) means for simulating strobe lighting at the aforesaid approach lights including a light source positioned beneath the simulated field,
    (d) said field having apertures corresponding to strobe light positions,
    (e) and means operable sequentially to control said apertures so that a momentary high intensity light beam is transmitted from said source through said apertures respectively toward the optical pick-up means to simulate approach strobe lighting effect.

7. Simulating apparatus for training aircraft personnel in night landing approach comprising:
    (a) a simulated landing field having an array of approach and landing lights,
    (b) optical pick-up and projection means for presenting a display of said field, the optical pick-up means and landing field being relatively movable in simulation of aircraft landing approach,
    (c) means for simulating strobe lighting at the aforesaid approach lights including a light source positioned beneath the simulated field,
    (d) said landing field having apertures corresponding to strobe light positions and reflectors above said apertures,
    (e) and a plurality of shutters operable sequentially to transmit a momentary high intensity light beam from said source through said apertures respectively,
    (f) said light beam being reflected at a low angle toward said optical pick-up means to simulate approach strobe lighting effect.

8. Simulating apparatus as specified in claim 7 wherein the simulated landing field comprises an apertured plate and the respective shutters are positioned beneath said plate so as to cover and uncover the respective apertures, said shutters each having a plurality of openings that are small as compared with a plate aperture to represent approach lights.

9. Simulating apparatus as specified in claim 8 wherein the shutters are opened momentarily in sequence by motor operated cam mechanism so that the light beam is transmitted directly from the light source through said apertures for reflection toward the optical pick-up means.

10. Simulating apparatus as specified in claim 9 wherein the shutters are spring-biased to closed position for simulating the plurality of approach lights at each shutter, and the cam mechanism consists of a cam shaft operated at constant speed by a motor, the cam shaft having mounted thereon a plurality of cams, each angularly spaced around the cam shaft axis for sequential opening of the shutters to simulate the strobe lighting.

11. Simulating apparatus as specified in claim 7 wherein each shutter has a light baffle depending therefrom so as to preclude transmission of direct non-reflected light to the optical pick-up means.

12. Simulating apparatus as specified in claim 3 having light-baffle structure extending beneath the landing field at respective apertures so as to preclude transmission of direct non-reflected light from that part of the light source nearest the terminal end of the landing field, to the optical pick-up means.

13. Simulating apparatus as specified in claim 10 having a solenoid controlled brake for said cam shaft and circuitry including a motor control switch and a switch operable by the cam shaft, said circuitry arranged upon opening of the motor switch to cause setting of the brake at a predetermined angular position of the cam shaft representing closure of all said shutters to simulate the approach lights for non-strobe operation.

14. Simulating apparatus for training aircraft personnel in night-landing approach comprising:
    (a) a simulated landing strip having thereon a pattern of approach and landing lights,
    (b) electrical illumination means, (c) optical pick-up means for representing the flight approach, said optical pick-up means and landing strip being mounted for relative movement,
(d) optical projection means controlled by said optical pick-up means,
(e) the aforesaid landing strip having light apertures through which light from said illuminating means is transmitted to represent respectively approach and landing lights for reception by the optical pick-up means,
(f) an electric motor,
(g) and mechanical shutter structure positioned between the illuminating means and landing strip and operable by said motor for controlling transmission of light from the illuminating means to the optical pick-up means so as to produce sequential light flashes from respective light positions along the landing strip, said flashes moving progressively along the strip and directed toward the optical pick-up means thereby to simulate strobe-lighting effect.

References Cited in the file of this patent

UNITED STATES PATENTS

| | | |
|---|---|---|
| 2,794,967 | Coggins et al. | June 4, 1957 |
| 2,979,832 | Klemperer | Apr. 18, 1961 |
| 2,981,008 | Davis et al. | Apr. 25, 1961 |